United States Patent
Nishida

(10) Patent No.: US 7,193,781 B2
(45) Date of Patent: Mar. 20, 2007

(54) OPTICAL SUBSTRATE AND ANTIREFLECTIVE FILM

(75) Inventor: Mitsuhiro Nishida, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 11/091,332

(22) Filed: Mar. 29, 2005

(65) Prior Publication Data

US 2005/0244623 A1 Nov. 3, 2005

Related U.S. Application Data

(63) Continuation of application No. PCT/JP03/12603, filed on Oct. 1, 2003.

(30) Foreign Application Priority Data

Oct. 2, 2002 (JP) ............................ 2002-290171

(51) Int. Cl.
*G02B 1/10* (2006.01)

(52) U.S. Cl. ..................................... 359/587; 359/580

(58) Field of Classification Search ................ 359/586, 359/587, 580, 582
See application file for complete search history.

(56) References Cited

U.S. PATENT DOCUMENTS

| | | | |
|---|---|---|---|
| 4,374,158 A | 2/1983 | Taniguchi et al. | |
| 5,496,641 A | 3/1996 | Mase et al. | |
| 6,248,448 B1* | 6/2001 | Lippey et al. | 428/432 |
| 2002/0090521 A1* | 7/2002 | Nakajima et al. | 428/446 |
| 2005/0233131 A1* | 10/2005 | Nishida et al. | 428/323 |

FOREIGN PATENT DOCUMENTS

| | | |
|---|---|---|
| EP | 0730168 A2 | 9/1996 |
| EP | 0 764 857 A1 | 3/1997 |
| EP | 0791636 A1 | 8/1997 |
| EP | 1041404 A2 | 10/2000 |
| EP | 1298159 A1 | 4/2003 |
| JP | 60-221702 A | 11/1985 |
| JP | 62-11801 A | 1/1987 |
| JP | 01-217402 A | 8/1989 |
| JP | 04-366801 A | 12/1992 |
| JP | 2000-351937 A | 12/2000 |
| JP | 2001-201602 A | 7/2001 |
| JP | 2002-55202 A | 2/2002 |

* cited by examiner

*Primary Examiner*—Fayez G. Assaf
(74) *Attorney, Agent, or Firm*—Sughrue Mion, PLLC

(57) ABSTRACT

An optical substrate includes a transparent substrate; an interference spot-preventing layer composed of at least one sublayer, the interference spot-preventing layer being coated on the transparent substrate; and a hard coat layer disposed on the interference spot-preventing layer. In the optical substrate, when the complex refractive index of the hard coat layer at light of 550 nm is represented as $n_H - ik$, $n_H$ is 1.45 to 1.59 and k is substantially zero. When the optical admittance of the interface between the interference spot-preventing layer and the hard coat layer is represented as $(x+iy)$, x and y satisfy the formula of $(x-n_H)^2 + y^2 \leq 0.08$.

15 Claims, 7 Drawing Sheets

US 7,193,781 B2

OPTICAL SUBSTRATE AND ANTIREFLECTIVE FILM

CROSS REFERENCE TO RELATED APPLICATION

This is a continuation application of PCT/JP03/12603 filed on Oct. 1, 2003.

BACKGROUND OF THE INVENTION

1. Field of the Invention

The present invention relates to an optical substrate that prevents an interference spot, and in particular, to an optical substrate that prevents an interference spot and is applied to various displays such as word processors, computers, and televisions; a polarizer used in liquid crystal display devices; optical lenses such as sunglass lenses composed of a clear plastic, prescription glass lenses, and view finder lenses for cameras; covers of various instruments; and window glasses of automobiles or electric trains. Furthermore, the present invention relates to an antireflective film composed of this optical substrate.

2. Description of the Related Art

A transparent substrate composed of, for example, glass or a plastic is used in window glass, displays such as personal computers and word processors, and other various commercial displays. In addition, it has been required that a film is applied on windshields of automobiles in order to prevent the glass from shattering. Physical stresses, for example, scratching by the hand, scratching by a pencil or the like, and hitting with a sharp metal object or chemical stresses due to, for example, alkali or acidic cleaners are applied on such surfaces at any time. Therefore, a hard coat layer is generally provided on the surfaces so that the surfaces are not damaged by these stresses, in particular, the physical stresses.

However, it is known that when a laminated product including different kinds of substrates is irradiated with light, a specific reflection spectrum is generated because of the difference in the refractive index. FIG. 1 shows the reflection spectrum of a polyethylene terephthalate (PET) film, which is a normal polyester resin film, having a hard coat layer thereon. The PET film has a refractive index of 1.66, the hard coat layer has a refractive index of 1.52, and the PET film has a thickness of 2.9 μm. As shown in FIG. 1, when light is incident on the PET film on which the hard coat layer is coated, the reflectance of light is periodically changed according to the wavelength of the incident light. Such a reflection spectrum having a specific repeating cycle is hereinafter referred to as a fringe.

It is known that the cycle of the fringe is long at the long wavelength side and is short at the short wavelength side, and in addition, the larger the film thickness, the shorter the cycle. The amplitude of the fringe depends on the difference between the refractive index of the substrate and the refractive index of the hard coat layer. The larger the difference between the refractive index of the substrate and that of the hard coat layer, the larger the amplitude.

This fringe generates a spot pattern in the reflected light of a fluorescent lamp, thereby significantly impairing the appearance (this spot pattern is hereinafter referred to as an interference spot).

As described above, the larger the difference between the refractive index of the substrate and that of the hard coat layer, the larger the amplitude of the fringe and the darker the shading of the interference spot. The dark interference spot causes significant user discomfort. For example, when a commercially available antireflective film is applied on the surface of a display (composed of PET having a refractive index of 1.66) in order to prevent reflection, such an interference spot distinctly appears in the reflected light. This is caused by large amplitude of the fringe due to a large difference between the refractive index of the hard coat layer and that of the PET. In a 3-wavelength neutral white fluorescent lamp (FLR40SEX-N/M/36-HG from NEC Corporation, 40 W), a fluorescent coating of the fluorescent lamp includes a rare earth element to improve the luminous efficiency. In particular, when the above display is irradiated with this fluorescent lamp, a significantly distinct interference spot is generated. The reason for this is as follows: Since the emission wavelength of the above fluorescent lamp is limited to specific wavelengths (in particular, 450, 540, and 610 nm), the difference in the reflectance in the emission wavelength range becomes distinctly apparent.

The generation mechanism of such an interference spot will now be described.

In the coating of a hard coat layer, a completely even film cannot be formed and a local difference in the film thickness is inevitably generated. The difference in the film thickness is in the range of about 1% to about 5% of the film thickness. As described above, the reflection spectrum is different depending on the film thickness. As a result, the interference spot is generated.

A hard coat layer (refractive index 1.52) was coated on a PET film (refractive index 1.66) and the thickness of the hard coat layer was varied. The resultant films were irradiated with a 3-wavelength fluorescent lamp. FIG. 2 shows the relationship between the thickness of the hard coat layer and the color. In FIG. 2, parameters represented by x and y indicate x and y in an XYZ chromaticity diagram. As shown in FIG. 2, when the film thickness of the hard coat layer is different, the reflection spectrum at the position is also different. As a result, the reflected color is changed. This is the cause of the optical interference spot (spot pattern). As described above, when the difference between the refractive index of the substrate and that of the hard coat layer is large, the amplitude of the reflection spectrum is also large. Therefore, the change in the reflected color due to the difference in the film thickness is increased, thereby darkening the shading of the interference spot.

Hitherto, in order to prevent the interference spot, i.e., spot pattern, the following three methods (1) to (3) are performed.

(1) According to a first method, the hard coat layer having a very large thickness is formed. Such a very large thickness of the hard coat layer significantly decreases the cycle of the fringe. Consequently, even when the film thickness of the hard coat layer is locally different, the change in color is not significant.

However, this method in which the hard coat layer is applied so as to have a large thickness has the following problems. The hard coat layer having a thickness of at least 20 to 30 μm must be coated in order that the interference spot is not visible. In such a case, since the curing shrinkage during the curing of the hard coat layer is significant, it is difficult to perform the coating. The cost is also very high. In addition, cracks are often generated in the hard coat layer. In order to prevent such cracks, a material having a relatively low hardness may be used as the hard coat layer. Even when such a material is applied, the cost is very high and the coating is also difficult. Furthermore, since the hard coat layer composed of such a soft material has a low hardness, scratches are easily generated.

(2) According to a second method, the refractive index of the substrate is controlled to be close to that of the hard coat layer. In general, the hard coat layer has a refractive index of about 1.49 to about 1.55. For example, a cellulose triacetate (TAC) film has a refractive index of 1.49, which is almost the same as that of the hard coat layer. When the TAC film is used as the substrate, the amplitude of the fringe becomes very small. As a result, the shading of the interference spot is light.

However, the TAC film is significantly more expensive than the PET film. Furthermore, the film itself is soft and tears easily. Since the substrate is soft, for example, dents may occur during the coating, which is appearance defect. In addition, even when a hard coat layer is coated on the substrate, the resultant substrate has low pencil hardness because the TAC film disposed under the hard coat layer is soft.

(3) According to a third method, the refractive index of the hard coat layer is controlled to be close to that of the substrate. For example, an adequate amount of at least one kind of ultrafine metal oxide particles having a high refractive index selected from the group consisting of ZnO, $TiO_2$, $CeO_2$, $Sb_2O_5$, $SnO_2$, indium tin oxide (ITO), $In_2O_3$, $Y_2O_3$, $La_2O_3$, $Al_2O_3$, $HfO_2$, and $ZrO_2$ is mixed with a binder composed of a thermosetting resin and/or a resin curable by ionizing radiation. The mixture is used as the hard coat layer. Thus, the refractive index of the hard coat layer is close to the refractive index (in general, about 1.65) of the PET film, i.e., substrate.

However, this method has various problems as follows: Firstly, the ultrafine metal oxide particle contained in the hard coat layer normally has a color. Accordingly, when the hard coat layer having a thickness of at least 3 μm is coated so as to satisfy the hard coat performance, the hard coat layer has a color in most cases. When a color toning is performed in order to remove the color (i.e., to control the transmittance in each wavelength to be constant), the transmittance is decreased. Secondly, when the hard coat layer includes ultrafine particles other than silica, the hardness of the layer is lower than that of the hard coat layer that does not include the ultrafine particles. Furthermore, increasing the refractive index of the hard coat layer disposed on the top face increases the reflectance. As a result, a transmittance required for a transparent optical substrate cannot be provided.

As described above, although a normal substrate such as a PET film is inexpensive, the substrate has a high refractive index, which is significantly different from the refractive index of a hard coat layer. Accordingly, a technology is desired in which the interference spot is not visible even when a hard coat layer (refractive index 1.45 to 1.60) is coated on such a substrate.

SUMMARY OF THE INVENTION

It is an object of the present invention to provide a substrate with a hard coat layer in which the interference spot is not generated even when the difference between the refractive index of the substrate and that of the hard coat layer is large. Furthermore, it is an object of the present invention to provide an antireflective film composed of this substrate with the hard coat layer.

An optical substrate of the present invention includes a transparent substrate; an interference spot-preventing layer composed of at least one sublayer, the interference spot-preventing layer being coated on the transparent substrate; and a hard coat layer disposed on the interference spot-preventing layer. In the optical substrate, when the complex refractive index of the hard coat layer at light having a wavelength of 540 to 560 nm is represented as $n_H-ik$, $n_H$ is 1.45 to 1.59 and k is substantially zero. The phrase "k is substantially zero" means that the value k is selected such that a color is not visible at all. Specifically, k is 0.001 or less.

In the present invention, the amplitude of the fringe can approach zero by bringing the value of optical admittance (x+iy) of a laminated product consisting of the interference spot-preventing layer and the transparent substrate close to ($n_H$+i0). When the amplitude of the fringe is zero, the interference spot is not visible.

The interference spot-preventing layer may be formed by coating of two or more sublayers. In terms of the cost, the interference spot-preventing layer is preferably formed by coating a single sublayer.

In the present invention, when the optical admittance of the interface between the interference spot-preventing layer and the hard coat layer is represented as (x+iy), the value represented by $(x-n_H)^2+y^2$ is preferably 0.08 or less, more preferably, 0.03 or less, and most preferably, 0.01 or less in at least a part of a wavelength range from 540 to 560 nm.

The attenuation coefficient k at 550 nm of the transparent substrate, each sublayer of the interference spot-preventing layer, and the hard coat layer is preferably 0.001 or less.

The interference spot-preventing layer preferably includes at least one of a thermosetting resin and a resin curable by ionizing radiation; and at least one kind of ultrafine particles selected from the group consisting of ZnO, $TiO_2$, $CeO_2$, $Sb_2O_5$, $SnO_2$, ITO, $In_2O_3$, $Y_2O_3$, $La_2O_3$, $Al_2O_3$, $HfO_2$, and $ZrO_2$. The amount of the ultrafine particles is preferably 0.1 to 85 parts by weight per 100 parts by weight of the resin.

According to an embodiment of the present invention, the interference spot-preventing layer preferably includes at least one of a thermosetting resin and a resin curable by ionizing radiation. In addition, the at least one of the thermosetting resin and the resin curable by ionizing radiation preferably includes 0.1 to 60 parts by weight of at least one of bromine, sulfur, and a phenyl group.

The interference spot-preventing layer may further include fine silica particles. The fine silica particles preferably have a particle diameter of 380 nm or less. The amount of the fine silica particles is preferably 20 to 80 parts per hundred parts of resin (PHR).

The hard coat layer may be formed by coating.

According to an embodiment of the present invention, the transparent substrate preferably has a refractive index of 1.62 to 1.68, more preferably, about 1.66, the hard coat layer preferably has a refractive index of 1.50 to 1.54, more preferably, about 1.52, and the interference spot-preventing layer preferably has a refractive index of 1.565 to 1.605, more preferably, about 1.585. In this embodiment, the interference spot-preventing layer preferably has a thickness of 80 to 95 nm.

DESCRIPTION OF THE PREFERRED EMBODIMENTS

Embodiments will now be described in detail with reference to the drawings according to need.

An optical admittance Y is defined as a ratio of magnetic field component H to an electric field component E of light waves (Y=H/E). When the light waves are progressive waves progressing in a single layer having a refractive index of $n_s$, the relationship between the refractive index $n_s$ of the layer and the optical admittance Y of the layer is represented as follows:

$$Y = \frac{1}{(\varepsilon_0/\mu_0)^{1/2}} n_s \qquad (1)$$

wherein $\varepsilon_0$ represents a dielectric constant in vacuum and $\mu_0$ represents a magnetic permeability in vacuum. A unit system in which the light velocity and the magnetic permeability in vacuum are 1 is customarily used. Accordingly, the optical admittance Y corresponds with the refractive index $n_s$ of the medium as follows:

$$Y=n_s \qquad (2)$$

The case wherein light waves progress in a single layer having a refractive index of $n_s$ has been described. In contrast, when light waves progress in a substrate that includes a plurality of laminated thin films having different refractive indexes in the film thickness direction, a part of the progressive waves is reflected on the interface of each layer and is then returned in the direction opposite to the progressive waves (the waves that are returned in the direction opposite to the progressing direction may hereinafter referred to as regressive waves). Accordingly, light waves in each layer become composite waves formed by the progressive waves and the regressive waves returned by reflecting on a plurality of interfaces. Therefore, the electric field component E and the magnetic field component H of the light waves (composite waves) in each layer are different from those of only the progressive waves. As a result, the optical admittance Y, which is a ratio of the magnetic field to the electric field, is also changed. Thus, the optical admittance Y in each layer does not correspond to the refractive index.

Figure 1:
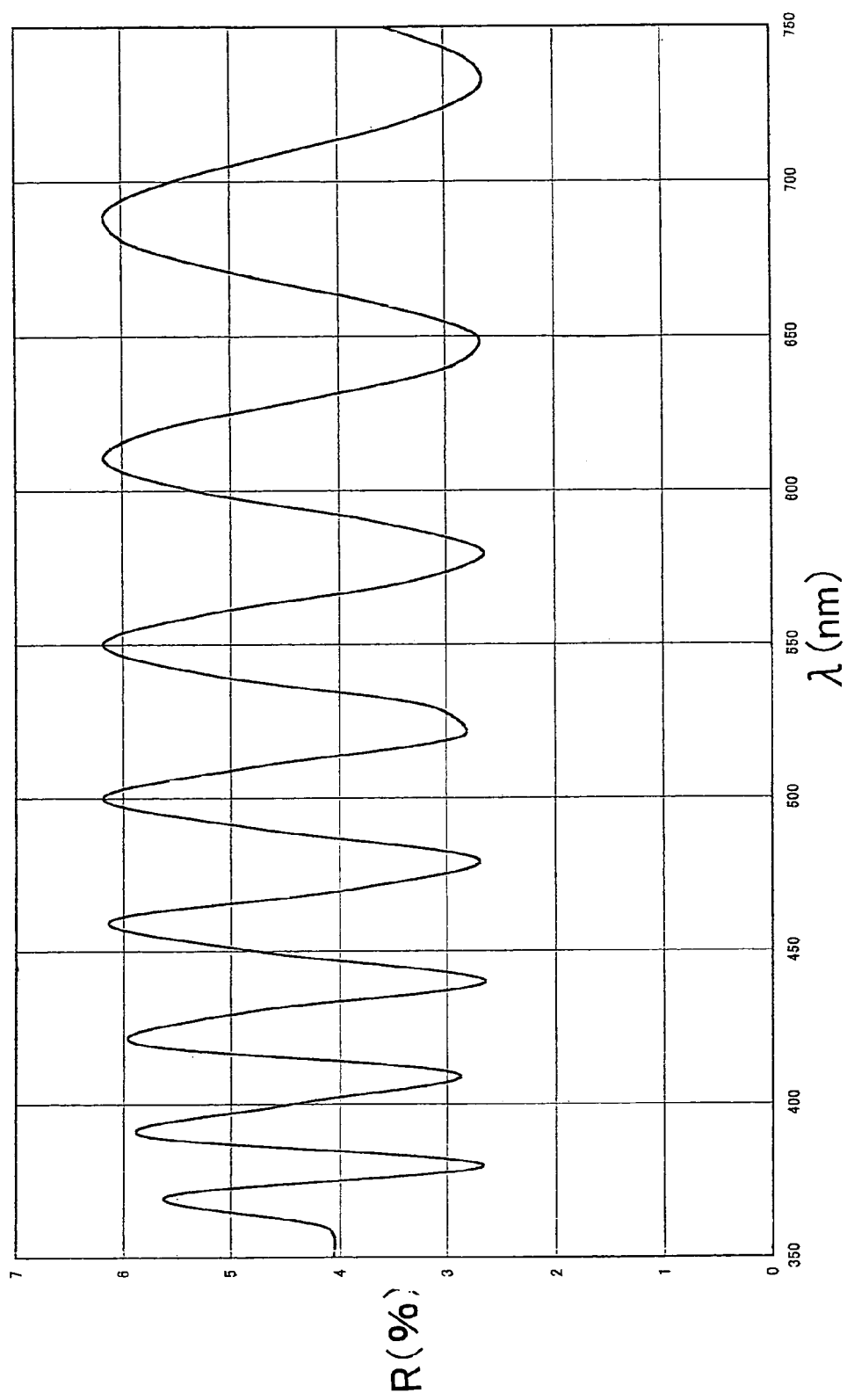
FIG. 1 is the reflection spectrum of a laminated product including a PET film and a hard coat layer.
Figure 2:
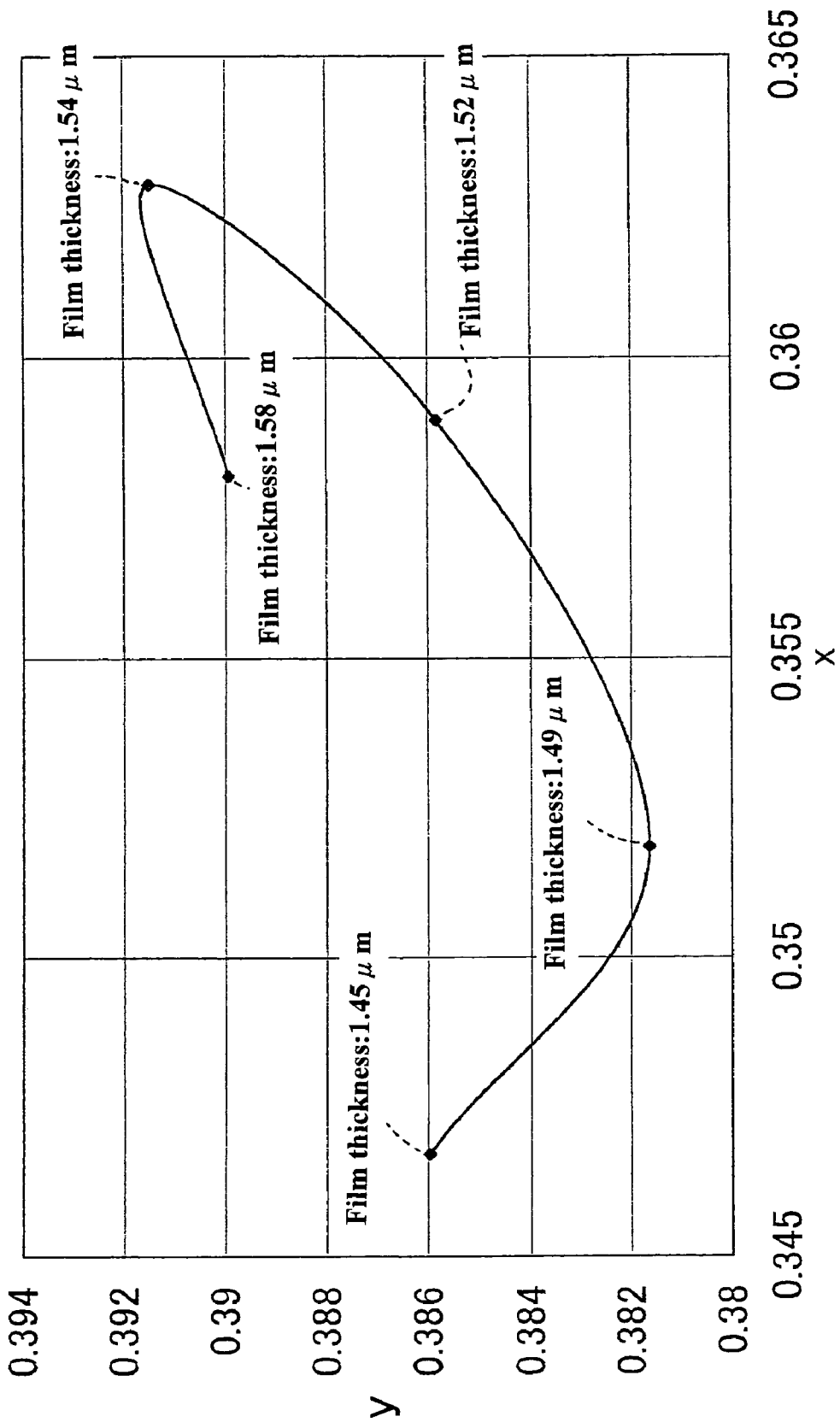
FIG. 2 is an XYZ chromaticity diagram showing the relationship between the film thickness of a hard coat layer and the reflected color of a laminated product including a PET film and the hard coat layer.
Figure 3:
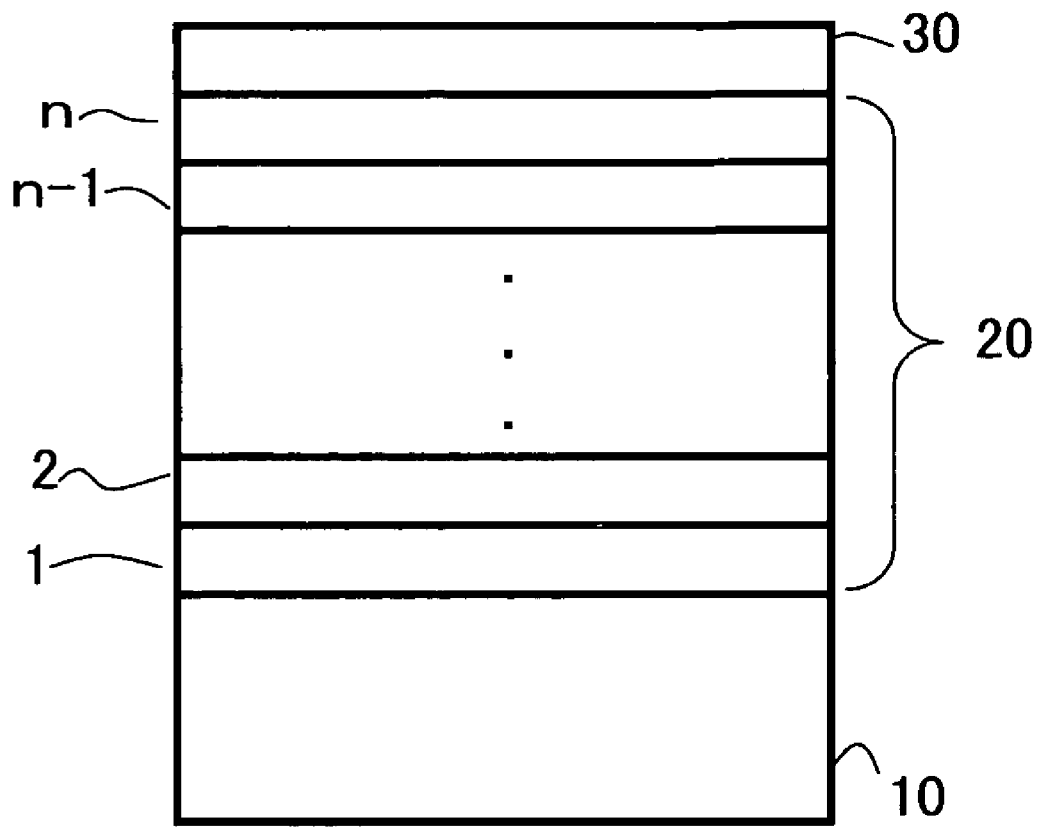
FIG. 3 is a cross-sectional view of an optical substrate with a hard coat layer.

FIG. 3 shows a cross-sectional view of an optical substrate with a hard coat layer. The optical substrate with a hard coat layer includes a transparent substrate 10, an interference spot-preventing layer 20 laminated on the transparent substrate 10, and a hard coat layer 30 laminated on the interference spot-preventing layer 20. In FIG. 3, the interference spot-preventing layer 20 is composed of n sublayers including a first sublayer 1, a second sublayer 2, and the like, an (n−1)th sublayer n−1, and an nth sublayer n wherein n represents a natural number. The interference spot-preventing layer 20 may be composed of one sublayer or a plurality of sublayers. In view of the coating cost, the interference spot-preventing layer 20 is preferably composed of one sublayer. When light is incident on the optical substrate from the hard coat layer 30 side, electric field components and magnetic field components are defined as follows. The electric field component and the magnetic field component of the light at the interface between the transparent substrate 10 and the first sublayer 1 are represented by $E_s$ and $H_s$, respectively. The electric field component and the magnetic field component of the light at a position away from the above interface toward the first sublayer 1 by a distance $d_1$ are represented by $E_d$ and $H_d$, respectively. These components have the following relationship:

$$\begin{pmatrix} E_d \\ H_d \end{pmatrix} = \begin{pmatrix} \cos\delta_1 & (1/n_1)\sin\delta_1 \\ in_1\sin\delta_1 & \cos\delta_1 \end{pmatrix} \begin{pmatrix} E_s \\ H_s \end{pmatrix} \qquad (3)$$

$$\delta_1 = 2\pi n_1 d_1 / \lambda \qquad (4)$$

wherein i represents the imaginary unit, $n_1$ represents a complex refractive index of the first sublayer, and λ represents the wavelength in vacuum of the incident light.

Accordingly, an optical admittance $Y_d$ at this position is represented as follows according to formula (3).

$$Y_d = \frac{H_d}{E_d} = \frac{Y_s \cos\delta_1 + in_1\sin\delta_1}{\cos\delta_1 + i(Y_s/n_1)\sin\delta_1} \qquad (5)$$

wherein $Y_s$ represents an optical admittance of the transparent substrate and $Y_s$ is represented by $Y_s=H_s/E_s$.

As is apparent from formulae (4) and (5), the optical admittance $Y_d$ in the first sublayer 1 is changed depending on the distance $d_1$ from the interface with the transparent substrate. Similar operations are performed in sequence on the ground that the optical admittance is continuous. Thus, an optical admittance of an nth sublayer (n represents a natural number) at an arbitrary position can be calculated.

An optical admittance at the interface between the hard coat layer and the nth sublayer n adjoining to the hard coat layer is represented by Y. An optical admittance at the interface between the top of the hard coat layer, that is, the hard coat layer, and the outside area (for example, air) of the hard coat layer is represented by $Y_e$. The optical admittance Y and the optical admittance $Y_e$ are represented as follows:

$$Y=x+iy \qquad (6)$$

$$Y_e=x_e+iy_e \qquad (7)$$

When the hard coat layer is considered to be transparent, in other words, when the complex refractive index of the hard coat layer is represented by only a real number n, an optical admittance Y at the interface between the hard coat layer and the nth sublayer n is represented by the following formulae (8) and (9):

$$x = \frac{x_e}{\left\{1 - \frac{2x_e \cdot \tan\delta}{n} + \frac{(x_e^2 + y_e^2) \cdot \tan^2\delta}{n^2}\right\} \cdot \cos^2\delta} \quad (8)$$

$$y = \frac{y_e(1 - \tan^2\delta) - n\left(1 - \frac{x_e^2 + y_e^2}{n^2}\right) \cdot \tan\delta}{1 - \frac{2y_e \cdot \tan\delta}{n} + \frac{(x_e^2 + y_e^2) \cdot \tan^2\delta}{n^2}} \quad (9)$$

wherein $$\delta = 2\pi n d/\lambda_o \quad (10)$$

$\lambda_0$ represents the wavelength in vacuum of the incident light, and d represents the film thickness of the hard coat layer.

The reflectance R is represented as follows using an optical admittance $Y_0$ at the outside area such as air (corresponding to the refractive index (real number) $n_0$ at the outside area) and the optical admittance $Y_e$ at the top of the hard coat layer (i.e., at the interface between the hard coat layer and the outside area):

$$R = \left|\frac{Y_e - Y_0}{Y_e + Y_0}\right|^2 \quad (11)$$

Accordingly, when the optical admittance $Y_e$ is known, the reflectance at each wavelength can be calculated.

Figure 4:
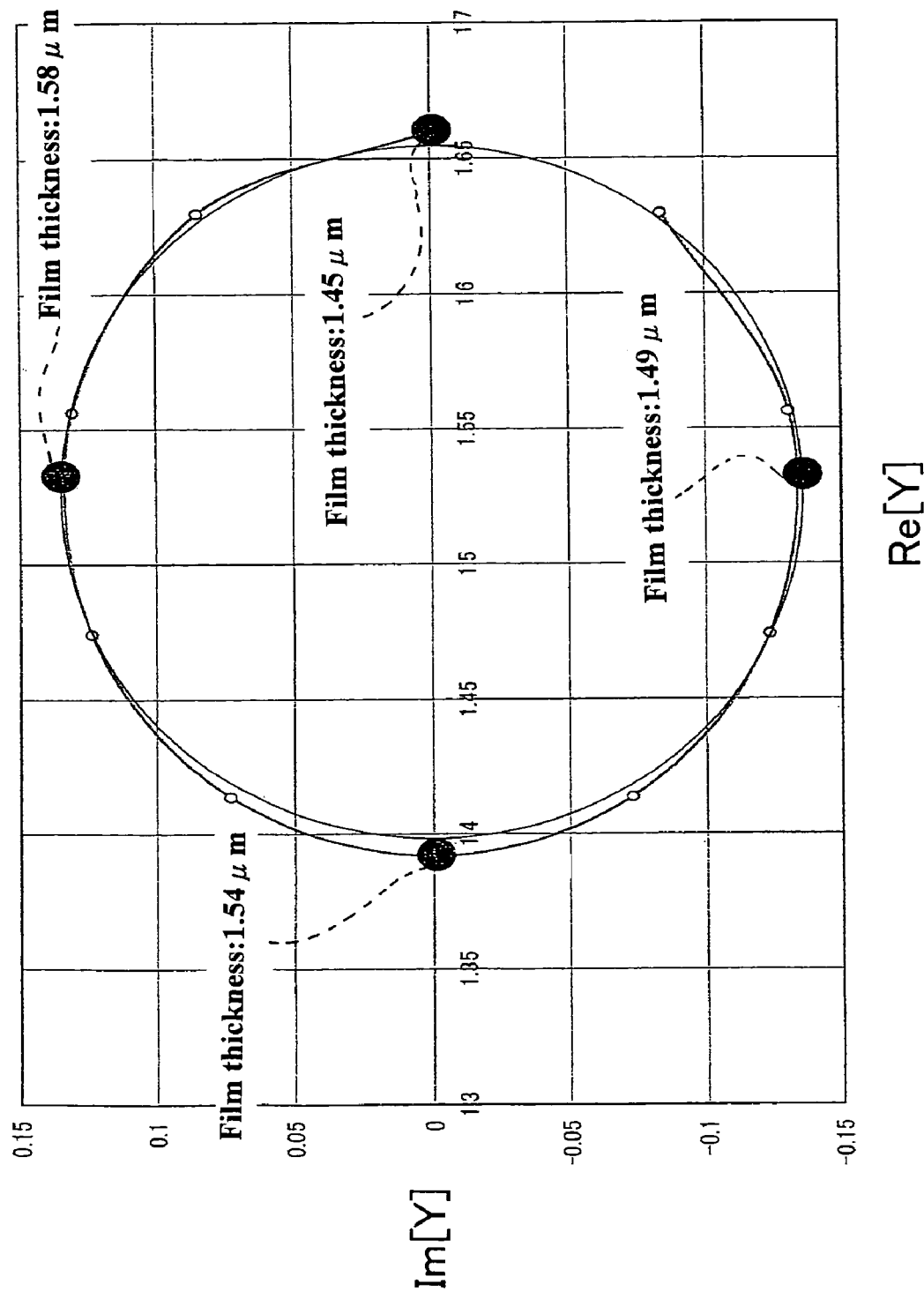
FIG. 4 is an admittance diagram showing the state wherein an optical admittance $Y_H$ of laminated products including a transparent PET substrate and a hard coat layer changes according to the thickness of the hard coat layer.

FIG. 4 is an admittance diagram of laminated products composed of a transparent PET substrate on which a hard coat layer is directly coated without forming an interference spot-preventing layer. Light having a wavelength of 550 nm was incident on the laminated product from the hard coat layer side. FIG. 4 shows that the optical admittance $Y_H$ of the laminated product is changed depending on the film thickness of the hard coat layer. In FIG. 4, the abscissa represents the real part Re [Y] of the optical admittance $Y_H$ and the ordinate represents the imaginary part Im [Y] thereof. The PET has a refractive index of 1.66 and the hard coat layer has a refractive index of 1.52. The optical admittance $Y_H$ forms a circle according to the change in the film thickness. The circle has the center at a coordinate (1.52, 0), which corresponds to the optical admittance of the hard coat layer itself, and includes a coordinate (1.66, 0), which corresponds to the optical admittance of the PET itself. Herein, the reflectance when the light is incident from the hard coat layer side can be calculated using formula (11) and the complex refractive index 1.0+0i of air.

The actual reflectance is proportional to the distance between the final admittance $Y_H$ coordinate in this admittance diagram and the admittance coordinate (1, 0) of air.

The reflectance of the laminated product including the transparent substrate and the hard coat layer at the light waves of 550 nm is changed from 6.16% to 2.68% depending on the change in the film thickness of the hard coat layer. In this case, the amplitude of the fringe is very large, that is, 6.16−2.68=3.48%. Accordingly, the shading due to the interference spot is distinctly visible.

Figure 5:
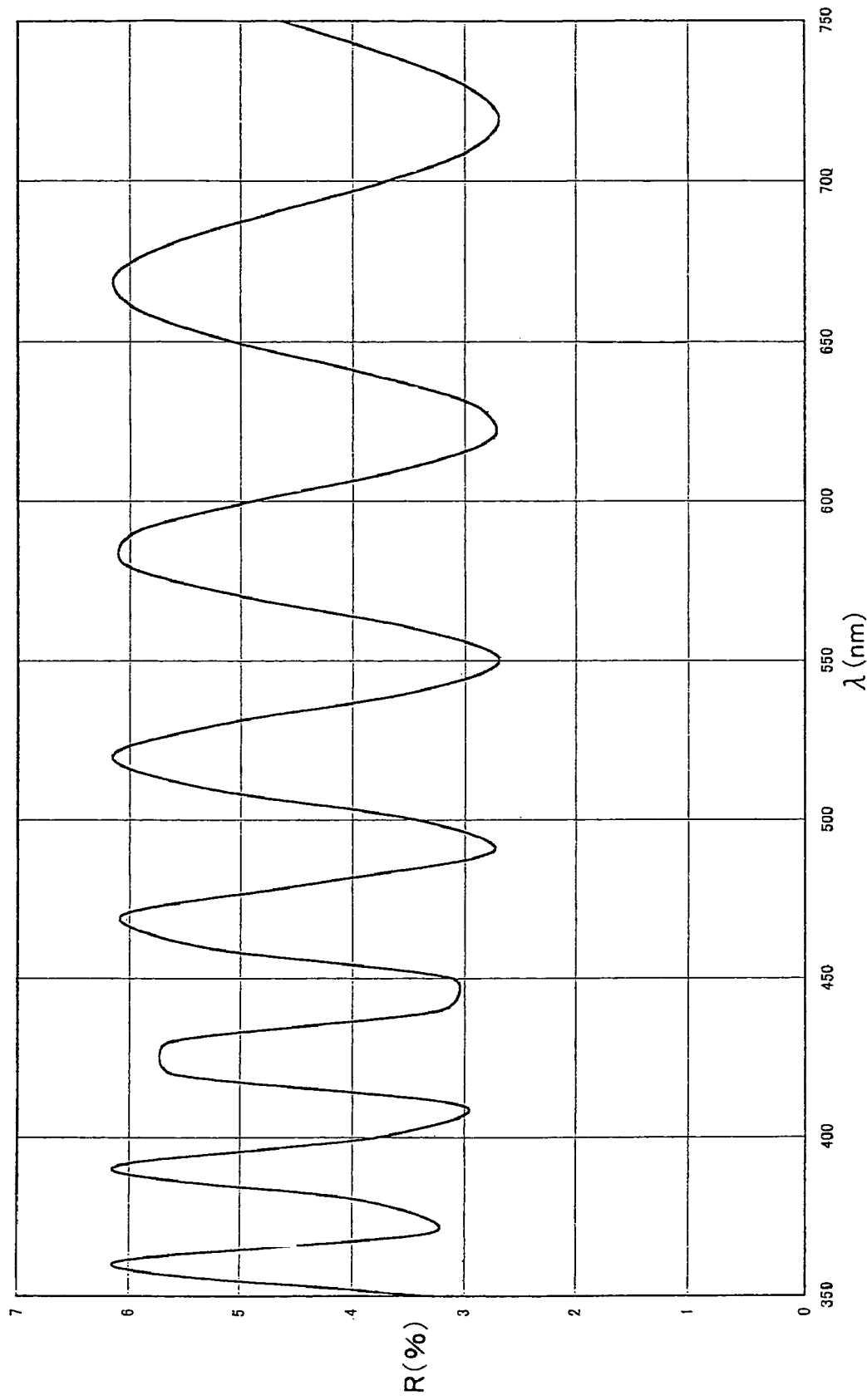
FIG. 5 is the reflection spectrum of a laminated product including a transparent substrate and a hard coat layer having a thickness of 1.537 μm.

FIG. 5 shows the reflection spectrum of a laminated product including a transparent substrate and a hard coat layer having a thickness of 1.537 μm. As shown in FIG. 5, when the hard coat layer having a refractive index of 1.52 is coated on the PET substrate having a refractive index of 1.66, the amplitude of the fringe is as very large as 3.48%.

Figure 6:
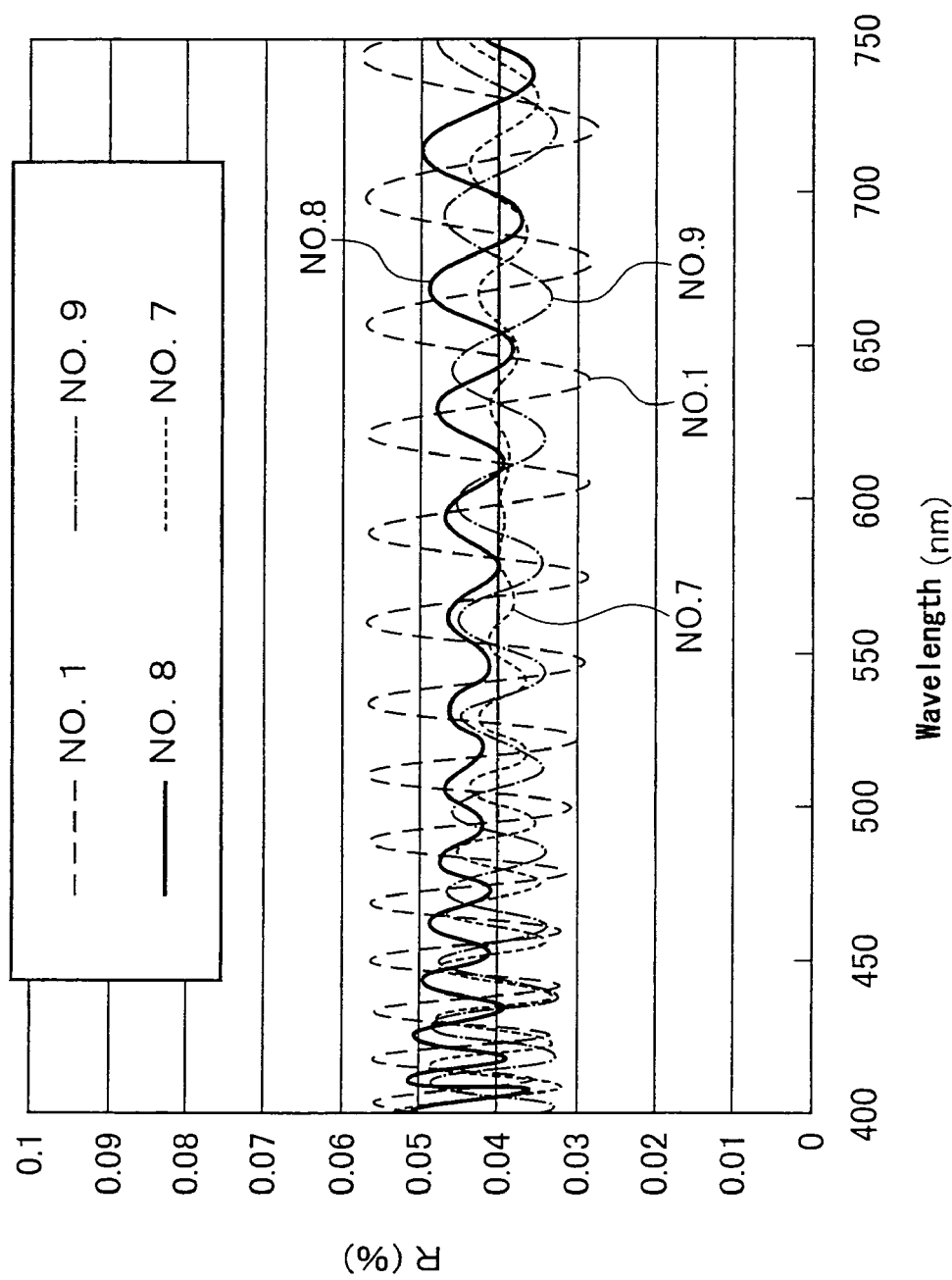
FIG. 6 includes some reflection spectra among optical substrates with a hard coat layer shown in Table 1.
Figure 7:
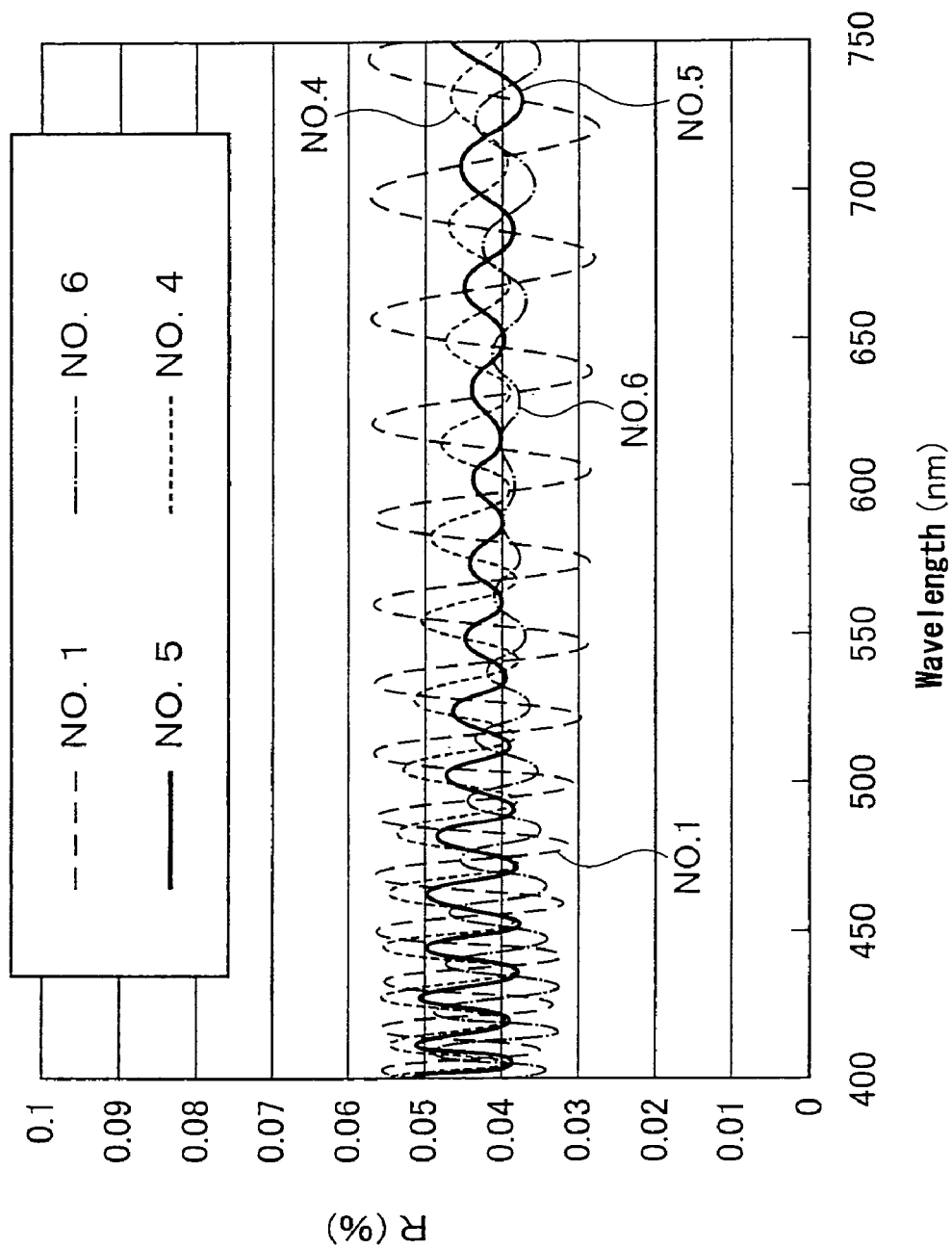
FIG. 7 includes some reflection spectra among the optical substrates with a hard coat layer shown in Table 1.

Subsequently, the amplitude at 550 nm of the fringe of an optical substrate with an interference spot-preventing layer will now be described. The optical substrate includes a transparent substrate, a hard coat layer, and the interference spot-preventing layer therebetween. The interference spot-preventing layer was composed of a single sublayer and the refractive index of the interference spot-preventing layer was varied. When the film thickness of the interference spot-preventing layer was controlled to about ¼λ of the wavelength of 550 nm, the value represented by $(x-n_H)^2+y^2$ was calculated (x, y, and $n_H$ will be defined later). Furthermore, a hard coat layer having a refractive index of 1.52 was coated on the interference spot-preventing layer. Table 1 shows the value and the appearance of the interference spot. FIGS. 6 and 7 show some of the reflection spectra of the optical substrates with the hard coat layer shown in Table 1.

TABLE 1

| No. | KZ7987 (weight %) | KZ7349 (weight %) | Refractive index of interference spot-preventing layer | Film thickness (λ at 550 nm) | $(x - nH)^2 + y^2$ (λ at 550 nm) | Fringe amplitude at 550 nm | Shading of interference spot |
|---|---|---|---|---|---|---|---|
| 1 | — | — | None | None | 0.140 | 2.8 | Very dark |
| 2 | — | — | 1.54 | ¼ | 0.091 | 1.3 | Dark |
| 3 | 0 | 100 | 1.55 | ¼ | 0.073 | 1.0 | Somewhat light |
| 4 | 30 | 70 | 1.559 | ¼ | 0.056 | 0.8 | Somewhat light |
| 5 | 40 | 60 | 1.574 | ¼ | 0.028 | 0.4 | Very light |
| 6 | 45 | 55 | 1.58 | ¼ | 0.016 | 0.2 | Barely visible |
| 7 | 50 | 50 | 1.585 | ¼ | 0.007 | 0.0 | Invisible |
| 8 | 60 | 40 | 1.598 | ¼ | 0.018 | 0.5 | Very light |
| 9 | 70 | 30 | 1.612 | ¼ | 0.045 | 1.1 | Somewhat light |

Mixtures of high refractive index hard coats KZ7987B (n=1.65) and KZ7349 (n=1.55) (from JSR Corporation) were used as the material of the interference spot-preventing layer. The refractive index was changed by changing the mixing ratio of the two components.

The optical admittance of a laminated product consisting of the transparent substrate and the interference spot-preventing layer coated thereon is represented as x+iy. The refractive index of the hard coat layer is represented as $n_H$. When a formula $(x-n_H)^2+y^2<0.08$ is satisfied at a wavelength of 550 nm, the interference spot became light. In particular, when an interference spot-preventing layer having a refractive index of 1.574 was used, the value represented by $(x-n_H)^2+y^2$ at a wavelength of 550 nm was 0.025 the amplitude of the fringe was 0.2%. As a result, the interference spot was barely visible. When an interference spot-preventing layer having a refractive index of 1.585 was used, the value represented by $(x-n_H)^2+y^2$ at a wavelength of 550 nm was 0.006 and the amplitude of the fringe was about zero. As a result, the interference spot was substantially invisible.

As described above, the optical admittance of the laminated product consisting of the transparent substrate and the interference spot-preventing layer, the laminated product being in the state before the hard coat layer is coated, is represented by $x+iy$. In such a case, decreasing the value of $(x-n_H)^2+y^2$ can decrease the amplitude of the fringe.

Various experiments showed the following results: When the value of $(x-n_H)^2+y^2$ at a wavelength of 550 nm was 0.08 or less, the interference spot was sufficiently light. When the value of $(x-n_H)^2+y^2$ at a wavelength of 550 nm was 0.03 or less, the interference spot was barely visible. When the value of $(x-n_H)^2+y^2$ at a wavelength of 550 nm was 0.01 or less, the interference spot was substantially invisible.

As described above, the interference spot-preventing layer may be composed of at least two sublayers. In terms of the cost, however, it is sufficient that the interference spot-preventing layer is composed of one sublayer.

An optical substrate having a single interference spot-preventing layer will now be described.

When a single interference spot-preventing layer is coated, and in addition, the film thickness is about $¼λ$ of the light of 550 nm, the refractive index of the interference spot-preventing layer is controlled to an intermediate value between the refractive index of a substrate (composed of, for example, PET) and that of a hard coat layer. In such a case, the value of $(x-n_H)^2+y^2$ approaches zero.

The interference spot-preventing layer is preferably composed of a material including a binder and fine metal oxide particles dispersed therein. Controlling the volume ratio of the fine metal oxide particles can change the refractive index of the interference spot-preventing layer.

Specifically, the interference spot-preventing layer is preferably composed of a thermosetting resin and/or a resin curable by ionizing radiation serving as the binder and fine metal oxide particles having a refractive index of at least 1.5. Examples of the fine metal oxide particles include at least one kind of ultrafine particles selected from the group consisting of ZnO (refractive index 1.90), $TiO_2$ (refractive index 2.3 to 2.7), $CeO_2$ (refractive index 1.95), $Sb_2O_5$ (refractive index 1.71), $SnO_2$ (refractive index 1.997), ITO (refractive index 1.95), $In_2O_3$ (refractive index 2.00), $Y_2O_3$ (refractive index 1.87), $La_2O_3$ (refractive index 1.95), $Al_2O_3$ (refractive index 1.63), $HfO_2$ (refractive index 2.00), and $ZrO_2$ (refractive index 2.05). The ultrafine particles preferably have an average particle diameter of 5 to 50 nm, more preferably, 5 to 10 nm. In addition, the ultrafine particles preferably have a refractive index higher than that of the binder.

Even when these ultrafine metal oxide particles are not used, the use of a binder composed of a thermosetting resin and/or a resin curable by ionizing radiation containing, for example, sulfur, bromine, or a phenyl group in the main chain can increase the refractive index.

Preferably, examples of the thermosetting resin and/or the resin curable by ionizing radiation used as the interference spot-preventing layer mainly include an oligomer or a prepolymer, a monofunctional monomer serving as a reactive diluent, and a multifunctional monomer. Examples of the oligomer or the prepolymer include compounds having an acrylate functional group such as (meth)acrylates (acrylate and methacrylate are hereinafter referred to as (meth)acrylate together) of a multifunctional compound having a relatively low molecular weight. Examples of the multifunctional compound include polyesters, polyethers, acrylic resins, epoxy resins, polyurethanes, alkyd resins, spiroacetal resins, polybutadiene, polythiol-polyene resins, and polyhydric alcohols. Examples of the monofunctional monomer include ethyl (meth)acrylate, ethylhexyl (meth)acrylate, styrene, vinyltoluene, and N-vinylpyrrolidone. Examples of the multifunctional monomer include trimethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentylglycol di(meth)acrylate.

When the above resins curable by ionizing radiation are used as ultraviolet curable resins, a photoinitiator or a photosensitizer is preferably mixed. Examples of the photoinitiator include acetophenones, benzophenones, Michler's benzoyl benzoate, α-acyloxime ester, and thioxanthones. Examples of the photosensitizer include n-butylamine, triethylamine, and tri-n-butylphosphine.

For example, a known thermosetting resin and/or a resin curable by ionizing radiation is used as the hard coat layer. The hard coat layer preferably has a thickness of 0.5 to 50 μm, more preferably, 3 to 20 μm.

An excessively small thickness of the hard coat layer cannot provide a high pencil hardness specified by Japanese Industrial Standards (JIS). On the other hand, an excessively large thickness of the hard coat layer impairs the flexibility of an antireflective film. Furthermore, such an excessively large thickness of the hard coat layer increases the curing time which causes a decrease in productivity. As a result, the production cost is increased.

Preferably, examples of the thermosetting resin and/or the resin curable by ionizing radiation used as the hard coat layer satisfying the above requirements mainly include an oligomer or a prepolymer, a monofunctional monomer serving as a reactive diluent, and a multifunctional monomer. Examples of the oligomer or the prepolymer include compounds having an acrylate functional group such as (meth)acrylates of a multifunctional compound having a relatively low molecular weight. Examples of the multifunctional compound include polyesters, polyethers, acrylic resins, epoxy resins, polyurethanes, alkyd resins, spiroacetal resins, polybutadiene, polythiol-polyene resins, and polyhydric alcohols. Examples of the monofunctional monomer include ethyl (meth)acrylate, ethylhexyl (meth)acrylate, styrene, vinyltoluene, and N-vinylpyrrolidone. Examples of the multifunctional monomer include trimethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentylglycol di(meth)acrylate.

In order to decrease the curing shrinkage during the curing, fine silica particles having an average particle diameter of 100 nm or less are often mixed in the reactive curable compounds. The addition of the fine silica particles decreases the curing shrinkage. Furthermore, the addition of the fine silica particles, for example, significantly increases the surface abrasion resistance and decreases the reflectance (i.e., improves the transmittance) because of the decrease in the refractive index of the hard coat layer.

When fine silica particles have a particle diameter larger than the wavelength of visible light (380 nm), light is scattered. As a result, the optical film is seen as a cloudy-white film. Therefore, the fine silica particles preferably have a particle diameter of 380 nm or less, in particular, 100 nm or less, for example, 10 to 100 nm. The amount of the fine silica particles to be mixed is preferably 80 parts by weight per one hundred parts by weight of the resin (i.e., 80 PHR) or less, in particular, 20 to 80 PHR. When the amount of silica particles exceeds 80 PHR, the amount of silica is excessive. In such a case, a void is generated in the film and the film strength is significantly deteriorated. When the amount of silica particles is 20 PHR or more, a satisfactory abrasion resistance is provided to the hard coat layer.

When the above resins curable by ionizing radiation are used as ultraviolet curable resins, a photoinitiator or a photosensitizer is preferably mixed. Examples of the photoinitiator include acetophenones, benzophenones, Michler's benzoyl benzoate, α-acyloxime ester, and thioxanthones. Examples of the photosensitizer include n-butylamine, triethylamine, and tri-n-butylphosphine.

A reactive organic silicon compound represented by general formula $R_mSi(OR')_n$ (wherein R and R' represent an alkyl group of 1 to 10 carbon atoms and m+n=4) may be mixed in the resins curable by ionizing radiation. Examples of the silicon compound include tetramethoxysilane, tetraethoxysilane, tetra-iso-propoxysilane, tetra-n-propoxysilane, tetra-n-butoxysilane, tetra-sec-butoxysilane, tetra-tert-butoxysilane, tetrapenta ethoxysilane, tetrapenta-iso-propoxysilane, tetrapenta-n-propoxysilane, tetrapenta-n-butoxysilane, tetrapenta-sec-butoxysilane, tetrapenta-tert-butoxysilane, methyltrimethoxysilane, methyltriethoxysilane, methyltripropoxysilane, methyltributoxysilane, dimethyldimethoxysilane, dimethyldiethoxysilane, dimethylethoxysilane, dimethylmethoxysilane, dimethylpropoxysilane, dimethylbutoxysilane, methyldimethoxysilane, methyldiethoxysilane, and hexyltrimethoxysilane.

The optical substrate of the present invention is most preferably used as an antireflective film or an AS film.

As described above, according to the present invention, when only the refractive index of a transparent substrate and the refractive index of a hard coat layer are provided, the generation of interference spot of light can be prevented by coating an interference spot-preventing layer between the transparent substrate and the hard coat layer.

What is claimed is:

1. An optical film comprising:
   a transparent substrate;
   an interference spot-preventing layer composed of at least two sublayers, the interference spot-preventing layer being coated on the transparent substrate; and
   a hard coat layer disposed on the interference spot-preventing layer,
   wherein the complex refractive index of the hard coat layer at light having a wavelength of 540 to 560 nm is represented as $n_H-ik$, $n_H$ is 1.45 to 1.59, and k is substantially zero.

2. The optical film according to claim 1, wherein the optical admittance of the interface between the interference spot-preventing layer and the hard coat layer is represented as (x+iy), and x and y satisfy the following formula in at least a part of a wavelength range from 540 to 560 nm:

$$(x-n_H)^2+y^2 \leq 0.08$$

3. The optical film according to claim 1, wherein the attenuation coefficient k at 550 nm of the transparent substrate, each sublayer of the interference spot-preventing layer, and the hard coat layer is 0.001 or less.

4. The optical film according to claim 1, wherein each sublayer of the interference spot-preventing layer comprises at least one of a thermosetting resin and a resin curable by ionizing radiation; and at least one kind of ultrafine particles selected from the group consisting of ZnO, $TiO_2$, $CeO_2$, $Sb_2O_5$, $SnO_2$, indium tin oxide, $In_2O_3$, $Y_2O_3$, $La_2O_3$, $Al_2O_3$, $HfO_2$, and $ZrO_2$; and the amount of the ultrafine particles is 0.1 to 85 parts by weight per 100 parts by weight of the resin.

5. The optical film according to claim 4, wherein each sublayer of the interference spot-preventing layer further comprises fine silica particles.

6. The optical film according to claim 5, wherein the fine silica particles have a particle diameter of 380 nm or less.

7. The optical film according to claim 5, wherein the amount of the fine silica particles is 20 to 80 PHR.

8. The optical film according to claim 1, wherein each sublayer of the interference spot-preventing layer comprises at least one of a thermosetting resin and a resin curable by ionizing radiation, and said at least one of the thermosetting resin and the resin curable by ionizing radiation includes 0.1 to 60 parts by weight of at least one of bromine, sulfur, and a phenyl group.

9. The optical film according to claim 8, wherein each sublayer of the interference spot-preventing layer further comprises fine silica particles.

10. The optical film according to claim 9, wherein the fine silica particles have a particle diameter of 380 nm or less.

11. The optical film according to claim 9, wherein the amount of the fine silica particles is 20 to 80 PHR.

12. The optical film according to claim 1, wherein the hard coat layer is formed by coating.

13. The optical film according to claim 1, wherein the transparent substrate comprises a polyethylene terephthalate film.

14. The optical film according to claim 1, wherein the transparent substrate has a refractive index of 1.62 to 1.68, preferably of about 1.66, the hard coat layer has a refractive index of 1.50 to 1.54, preferably of about 1.52, and each sublayer of the interference spot-preventing layer has a refractive index of 1.565 to 1.605, preferably of about 1.585, and wherein the interference spot-preventing layer has a thickness of 80 to 95 nm.

15. An antireflective film comprising the optical film according to any one of claims 1–14.

* * * * *